United States Patent
Mizutani et al.

(10) Patent No.: US 8,289,143 B2
(45) Date of Patent: Oct. 16, 2012

(54) HYBRID VEHICLE

(75) Inventors: Atsushi Mizutani, Toyota (JP); Hiroki Sawada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 452 days.

(21) Appl. No.: 12/671,078

(22) PCT Filed: Aug. 18, 2008

(86) PCT No.: PCT/JP2008/064686
§ 371 (c)(1),
(2), (4) Date: Jan. 28, 2010

(87) PCT Pub. No.: WO2009/031397
PCT Pub. Date: Mar. 12, 2009

(65) Prior Publication Data
US 2010/0194553 A1    Aug. 5, 2010

(30) Foreign Application Priority Data
Sep. 6, 2007  (JP) ................................ 2007-231608

(51) Int. Cl.
*B60Q 1/00*    (2006.01)
*B60L 9/00*    (2006.01)

(52) U.S. Cl. ..................... 340/438; 340/450.2; 340/455; 701/22

(58) Field of Classification Search ........................ None
See application file for complete search history.

(56) References Cited

U.S. PATENT DOCUMENTS

| | | | |
|---|---|---|---|
| 5,670,830 A | 9/1997 | Koga et al. | |
| 6,404,332 B1 * | 6/2002 | Wakashiro et al. | 340/456 |
| 2002/0171541 A1 | 11/2002 | Crombez | |
| 2003/0137278 A1 | 7/2003 | Kondo | |
| 2004/0079564 A1 * | 4/2004 | Tabata | 180/65.2 |
| 2005/0128065 A1 | 6/2005 | Kolpasky | |
| 2009/0079263 A1 * | 3/2009 | Crumm et al. | 307/43 |
| 2010/0038156 A1 * | 2/2010 | Fujitake et al. | 180/65.22 |

FOREIGN PATENT DOCUMENTS

| | | |
|---|---|---|
| EP | 1 068 976 A2 | 1/2001 |
| JP | U-57-166928 | 10/1982 |
| JP | U-58-63696 | 4/1983 |

(Continued)

OTHER PUBLICATIONS

International Search Report for International Application No. PCT/JP2008/064686, issued on Nov. 25, 2008 (w/ English translation).

(Continued)

*Primary Examiner* — Brian Zimmerman
*Assistant Examiner* — Omeed Alizada
(74) *Attorney, Agent, or Firm* — Oliff & Berridge, PLC

(57) ABSTRACT

An energy gauge includes a first section indicating a remaining amount of fuel, a second section indicating a remaining amount of stored electric power and a baseline. The first section and the second section extend to the right and left with respect to the baseline. A sub-section indicating the remaining amount of fuel and a sub-section indicating the remaining amount of stored electric power are displayed continuously and integrally across the baseline, commonly starting from the baseline. The first section and the second section are arranged at the right and left sides, respectively, with respect to the baseline in correspondence with the positions at which a fuel inlet and a charging inlet are disposed.

9 Claims, 5 Drawing Sheets

FOREIGN PATENT DOCUMENTS

| | | |
|---|---|---|
| JP | A-7-315078 | 12/1995 |
| JP | A-8-19114 | 1/1996 |
| JP | A-10-28302 | 1/1998 |
| JP | A-11-220803 | 8/1999 |
| JP | A-2008-247081 | 10/2008 |

OTHER PUBLICATIONS

European Search Report mailed May 4, 2011 issued in European Patent Application No. 08792532.7.

* cited by examiner (CHARGING INLET SIDE)    (FUEL INLET SIDE)

HYBRID VEHICLE

TECHNICAL FIELD

The present invention relates to a hybrid vehicle, and more particularly to a technique of displaying the remaining amount of energy in a hybrid vehicle to which a plurality of types of energy can be fed from outside the vehicle.

BACKGROUND ART

Japanese Patent Laying-Open No. 11-220803 discloses a running display apparatus in a hybrid vehicle. This running display apparatus adds a distance that the vehicle can travel calculated based on the remaining amount of stored electric power in a battery and a distance that the vehicle can travel calculated based on the remaining amount of gasoline, and based on the sum of the distances that the vehicle can travel, displays data on the total remaining amount of energy of the remaining amount of stored electric power in the battery and the remaining amount of gasoline.

When displaying data on the total remaining amount of energy, this running display apparatus can also display the remaining amount of stored electric power in the battery and the remaining amount of gasoline so as to be distinguishable from each other by display colors, gray-scale display or the like (cf. Patent Document 1).

Patent Document 1: Japanese Patent Laying-Open No. 11-220803
Patent Document 2: Japanese Patent Laying-Open No. 10-28302
Patent Document 3: Japanese Utility Model Laying-Open No. 58-63696

DISCLOSURE OF THE INVENTION

Problems to be Solved by the Invention

Hybrid vehicles having a plurality of energy sources include a known so-called plug-in hybrid vehicle to which not only fuel can be fed but also whose battery can be fed (charged) from a power supply outside the vehicle (such as a system power supply). In other words, the plug-in hybrid vehicle can be fed with a plurality of types of energy (fuel and electric power) from outside the vehicle.

Accordingly, the plug-in hybrid vehicle is provided with a plurality of energy feeding inlets (e.g., fuel inlet and a charging inlet). However, a user may be confused about the positional relation between the respective feeding inlets (for example, on which side of the vehicle, right or left).

The running display apparatus disclosed in Japanese Patent Laying-Open No. 11-220803 is useful in that data on the total remaining amount of energy of the remaining amount of stored electric power and the remaining amount of gasoline can be displayed to a user. However, when applied to the plug-in hybrid vehicle, the apparatus cannot solve the above-mentioned problem even if the remaining amount of stored electric power and the remaining amount of gasoline are displayed in different display colors or the like.

The present invention was therefore made to solve such a problem, and an object of the present invention is to provide a hybrid vehicle that can avoid user confusion about the positional relation between the respective energy feeding inlets.

Means for Solving the Problems

The present invention is directed to a hybrid vehicle capable of running while consuming at least one of first energy and second energy which can be fed from outside the vehicle. The hybrid vehicle includes a first feeding inlet, a second feeding inlet and a display device. The first and second feeding inlets are provided for feeding the first energy and the second energy from outside the vehicle, respectively. The display device displays first data on a remaining amount of the first energy and second data on a remaining amount of the second energy by respective magnitudes of a display length or a display area. The display device includes a baseline, a first section and a second section. The baseline indicates that values of the first data and the second data are zero or minimum values. The first section displays the first data starting from the baseline. The second section displays the second data continuously with the first data across the baseline, commonly starting from the baseline. The first section and the second section are located, with respect to the baseline, at positions corresponding to relative positions in the vehicle at which the first and second feeding inlets are disposed.

Preferably, the first feeding inlet is disposed on one of right and left side surfaces of the vehicle. The second feeding inlet is disposed on the other one of right and left side surfaces of the vehicle. The first section is located at a side corresponding to the one of the side surfaces of the vehicle with respect to the baseline. The second section is located at a side corresponding to the other one of the side surfaces of the vehicle with respect to the baseline.

Preferably, the first section displays the first data while showing a difference from a maximum value of the first data. The second section displays the second data while showing a difference from a maximum value of the second data.

Preferably, the display device includes a first indicator and a second indicator. The first indicator is provided at the side where the first section is located with respect to the baseline, and indicates that the first data relates to the remaining amount of the first energy. The second indicator is provided at the side where the second section is located with respect to the baseline, and indicates that the second data relates to the remaining amount of the second energy.

Preferably, the first data and the second data are displayed integrally across the baseline. When the sum of the first data and the second data falls below a prescribed value, the first and second sections change a mode of display of the first data and the second data with respect to a state in which the sum of the first data and the second data exceeds the prescribed value.

Preferably, the first data and the second data are displayed integrally across the baseline. When one of the first data and the second data falls below a prescribed value, the first and second sections change a mode of display of the first data and the second data with respect to a state in which both of the first data and the second data exceed the prescribed value.

Preferably, the first and second sections are arranged to be opposite to each other with respect to the baseline.

Preferably, the first and second sections are arranged to extend in a horizontal direction of the vehicle with respect to the baseline.

Preferably, the hybrid vehicle further includes a power storage device, a charging device, an electric motor, and an internal combustion engine. The power storage device stores electric power for the vehicle to run. The charging device is configured to be capable of charging the power storage device from a power supply outside the vehicle. The electric motor receives a supply of electric power from the power storage device to generate driving force for running. The first energy is fuel consumed by the internal combustion engine. The second energy is the electric power stored in the power storage device.

Preferably, the hybrid vehicle further includes a power storage device, a charging device, a fuel cell, and an electric motor. The power storage device stores electric power for the vehicle to run. The charging device is configured to be capable of charging the power storage device from a power supply outside the vehicle. The fuel cell generates electric power for the vehicle to run. The electric motor receives a supply of electric power from at least one of the fuel cell and the power storage device to generate driving force for running. The first energy is fuel consumed by the fuel cell. The second energy is the electric power stored in the power storage device.

Effects of the Invention

In this invention, the first section and the second section are displayed continuously across the baseline, commonly starting from the baseline. This achieves an integral display of the total remaining amount of the first energy and the second energy, while displaying the remaining amount of each of the first energy and the second energy. Since the first section and the second section are located at positions corresponding to relative positions in the vehicle at which the first feeding inlet and the second feeding inlet are disposed, a user can recognize at a glance the position of a feeding inlet corresponding to energy reduced in the remaining amount (on which side of the vehicle, right or left).

Accordingly, the present invention can avoid user confusion about the positional relation between the energy feeding inlets when feeding energy from outside the vehicle.

Figure 1:
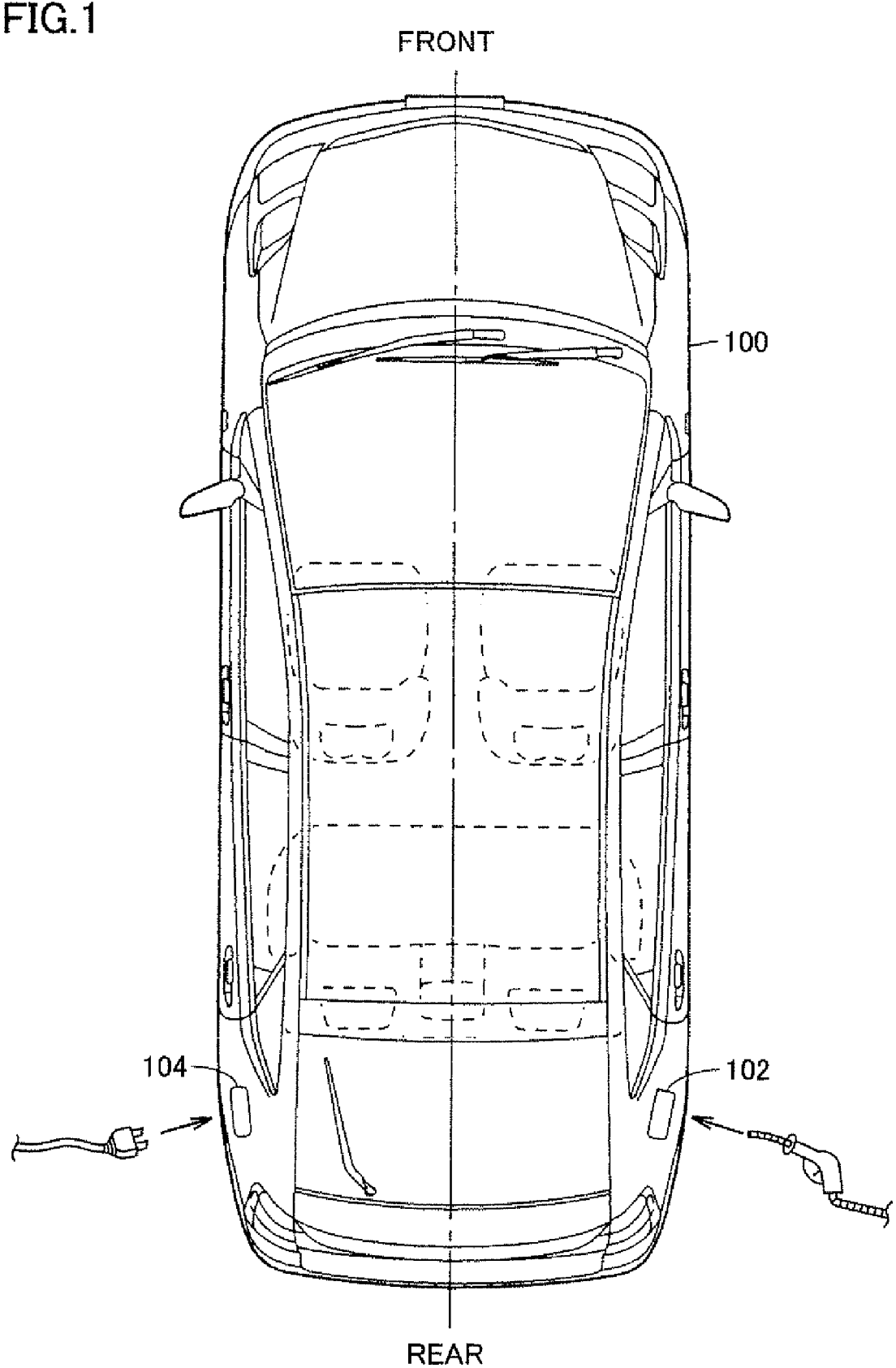
FIG. 1 is a plan view of a hybrid vehicle according to a first embodiment of this invention.

DESCRIPTION OF THE REFERENCE SIGNS 2 engine; 4 power split mechanism; 6, 10 motor generator; 8 reduction gear; 12 drive shaft; 14 wheel; 16 power storage device; 18, 20 power converter; 22 fuel tank; 24 fuel sensor; 26 charger; 28 voltage sensor; 30 current sensor; 32 temperature sensor; 34, 34A control unit; 36, 36A, 36B energy gauge; 40 battery ECU; 42 HV-ECU; 44 gauge computer; 52 first section; 54 second section; 56 baseline; 58, 60 sub-section; 62 first indicator; 64 second indicator; 100, 100A hybrid vehicle; 102 fuel inlet; 104 charging inlet; 106 fuel feeding inlet; 110 inverter; 112 fuel cell; 114 high-pressure tank; 118 converter

BEST MODES FOR CARRYING OUT THE INVENTION

In the following, embodiments of the present invention will be described in detail with reference to the drawings. Like reference characters denote like or corresponding parts throughout the drawings, and description thereof will not be repeated.

First Embodiment

FIG. 1 is a plan view of a hybrid vehicle according to a first embodiment of this invention. With reference to FIG. 1, a hybrid vehicle 100 includes a fuel inlet 102 and a charging inlet 104. As will be described later, this hybrid vehicle 100 is configured to be capable of running by means of an engine and a motor generator, and is configured such that a power storage device supplying electric power to the motor generator can be charged from a power supply outside the vehicle.

Fuel inlet 102 is a feeding inlet through which fuel is fed to a fuel tank that stores fuel for use in the engine, and is located rearward on the right side surface of the vehicle. Charging inlet 104 is an external charging interface through which electric power is fed to the power storage device from a power supply outside the vehicle (hereinafter also referred to as "an external power supply"), and is located on the other side surface of the vehicle opposite to fuel inlet 102, that is, rearward on the left side surface of the vehicle. It is to be noted that fuel inlet 102 may be disposed on the left side surface of the vehicle, and charging inlet 104 may be disposed on the right side surface of the vehicle.

This hybrid vehicle 100 can be fed with two types of energy, fuel and electric power, from outside the vehicle. Even when the remaining amount of one of the two types of energy is reduced to zero, the hybrid vehicle is capable of running consuming the other type of energy. A user is thus interested in the total remaining amount of energy. Further, a user of a hybrid vehicle such as this hybrid vehicle 100 to which two types of energy, fuel and electric power, can be fed from outside the vehicle may also be interested in which energy is reduced to what degree (which one of energy should be fed). Accordingly, as will be described later, this hybrid vehicle 100 displays the remaining amount of energy such that a user can recognize at a glance the total remaining amount of energy of the two types of energy, fuel and electric power, and can also recognize at a glance a reduction in the remaining amount of each type of energy.

In this hybrid vehicle 100 with fuel inlet 102 disposed rearward on the right side surface of the vehicle and charging inlet 104 disposed rearward on the left side surface of the vehicle, the user may be confused about the positions of fuel inlet 102 and charging inlet 104 when feeding fuel or electric power through fuel inlet 102 or charging inlet 104, respectively. Accordingly, as will be described later, this hybrid vehicle 100 displays the remaining amount of fuel and the remaining amount of stored electric power in correspondence with the positions at which fuel inlet 102 and charging inlet 104 are located.

Figure 2:
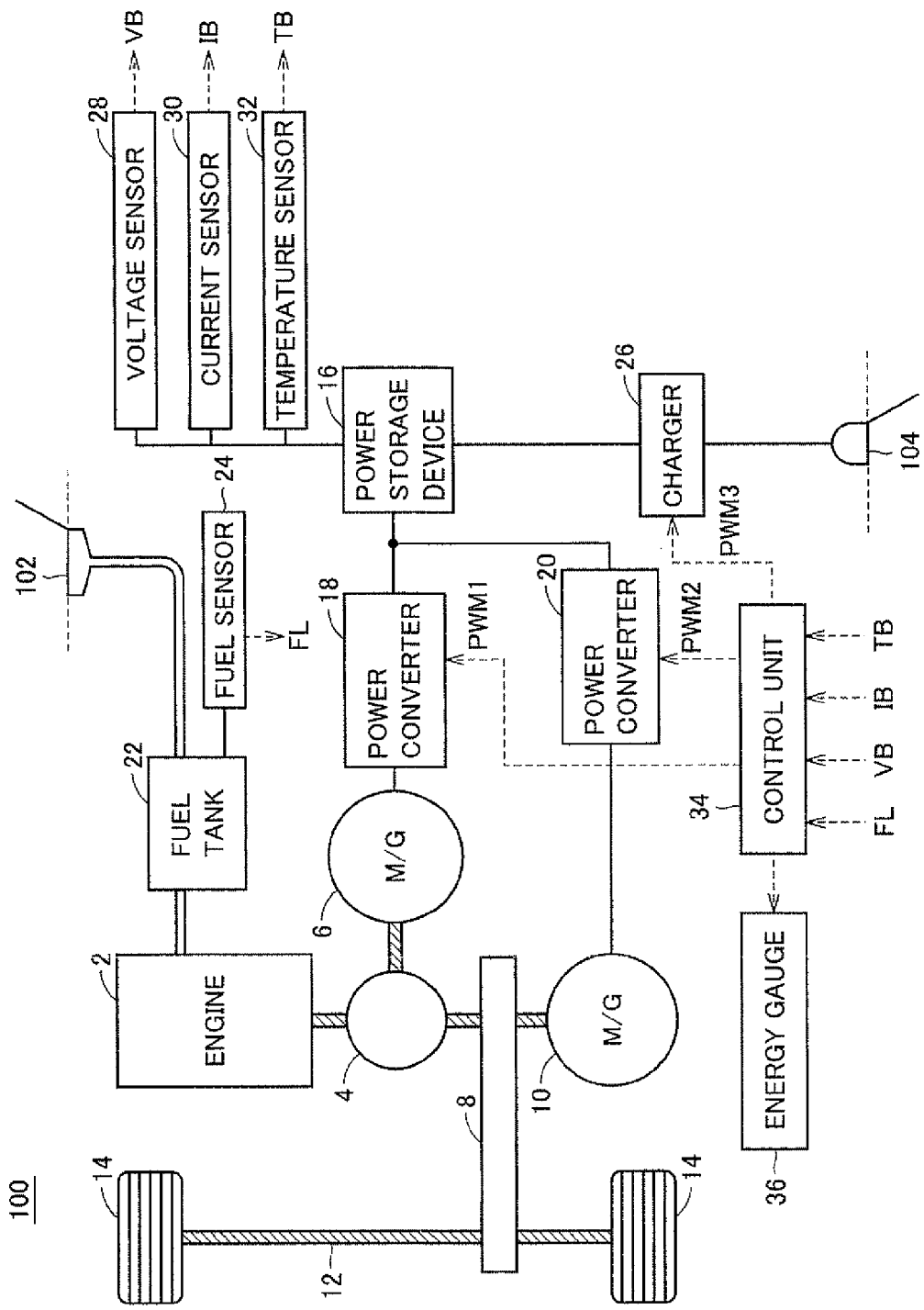
FIG. 2 is a functional block diagram of the hybrid vehicle shown in FIG. 1.

FIG. 2 is a functional block diagram of hybrid vehicle 100 shown in FIG. 1. With reference to FIG. 2, hybrid vehicle 100 includes an engine 2, a power split mechanism 4, motor generators 6 and 10, a reduction gear 8, a drive shaft 12 and a wheel 14. Hybrid vehicle 100 also includes a power storage device 16, a voltage sensor 28, a current sensor 30, a temperature sensor 32, and power converters 18 and 20. Hybrid vehicle 100 further includes a fuel tank 22, a fuel sensor 24, fuel inlet 102, a charger 26, charging inlet 104, a control unit 34 and an energy gauge 36.

Power split mechanism 4 is coupled to engine 2, motor generator 6 and reduction gear 8 to distribute motive power among them. For example, as power split mechanism 4, a planetary gear having three rotation shafts of a sun gear, a planetary carrier and a ring gear can be used. These three rotation shafts are connected to the rotation shafts of engine 2, motor generator 6 and reduction gear 8, respectively. The rotation shaft of motor generator 10 is coupled to that of reduction gear 8. That is, motor generator 10 and reduction gear 8 have the same rotation shaft, which is connected to the ring gear of power split mechanism 4.

Kinetic energy produced by engine 2 is distributed by power split mechanism 4 to motor generator 6 and reduction gear 8. That is, engine 2 is incorporated into hybrid vehicle 100 as a power source for driving reduction gear 8 that transmits motive power to drive shaft 12 as well as for driving motor generator 6. Motor generator 6 is incorporated into hybrid vehicle 100 so as to operate as a power generator driven by engine 2 and to operate as an electric motor that can start engine 2. Motor generator 10 is incorporated into hybrid vehicle 100 as a power source for driving reduction gear 8 that transmits motive power to drive shaft 12.

Power storage device 16 is a chargeable and dischargeable DC power source, and implemented by, for example, a nickel metal hydride, lithium ion or similar secondary battery. Power storage device 16 supplies electric power to power converters 18 and/or 20. During power generation by motor generator 6 and/or motor generator 10, power storage device 16 is charged with electric power received from power converters 18 and/or 20. During charging from an external power supply (not shown) connected to charging inlet 104, power storage device 16 is charged with electric power received from charger 26. As power storage device 16, a large-capacitance capacitor may be adopted. Any electric power buffer may be used that is capable of temporarily storing electric power generated by motor generator 6 and/or motor generator 10 or electric power received from an external power supply and capable of supplying the stored electric power to motor generator 6 and/or motor generator 10.

Voltage sensor 28 detects a value of a voltage VB at power storage device 16 to output the detected value to control unit 34. Current sensor 30 detects a value of a current IB flowing into/out of power storage device 16 to output the detected value to control unit 34. Temperature sensor 32 detects a value of a temperature TB at power storage device 16 to output the detected value to control unit 34.

Based on a signal PWM1 from control unit 34, power converter 18 converts electric power generated by motor generator 6 into DC power for output to power storage device 16. Based on a signal PWM2 from control unit 34, power converter 20 converts DC power received from power storage device 16 into AC power for output to motor generator 10. At the start of engine 2, power converter 18, based on signal PWM1, converts DC power received from power storage device 16 into AC power for output to motor generator 6. During braking of the vehicle or reduction in the acceleration on a down slope, power converter 20, based on signal PWM2, converts electric power generated by motor generator 10 into DC power for output to power storage device 16.

Motor generators 6 and 10 are AC motors, and are each implemented by, for example, a three-phase synchronous electric motor with a permanent magnet embedded in a rotor. Motor generator 6 converts kinetic energy produced by engine 2 into electric energy for output to power converter 18. Motor generator 6 also generates driving force by three-phase AC power received from power converter 18 to start engine 2.

Motor generator 10 generates driving torque for the vehicle by three-phase AC power received from power converter 20. During braking of the vehicle or reduction in the acceleration on a down slope, motor generator 10 converts mechanical energy stored in the vehicle as kinetic energy or potential energy into electric energy for output to power converter 20.

Engine 2 converts thermal energy produced by fuel combustion into kinetic energy of a movable member such as a piston or a rotor, and outputs the converted kinetic energy to power split mechanism 4. For example, when the movable member is a piston and makes a reciprocating motion, the reciprocating motion is converted into a rotational motion through a so-called crank mechanism, such that the kinetic energy of the piston is transmitted to power split mechanism 4. Fuel suitable for engine 2 is a hydrocarbon fuel such as gasoline, light oil, ethanol, liquid hydrogen or natural gas, or a liquid or gaseous hydrogen fuel.

Fuel tank 22 stores fuel supplied through fuel inlet 102, and supplies the stored fuel to engine 2. Fuel sensor 24 detects the remaining amount of fuel in fuel tank 22 to output a signal FL indicating the detected remaining amount of fuel to control unit 34. In the case of a liquid fuel, a sender gauge detecting the liquid level in fuel tank 22 is suitable for fuel sensor 24. In the case of a gaseous fuel, it is suitable to configure such that the fuel amount in fuel tank 22 is estimated based on the pressure or temperature in fuel tank 22. Alternatively, fuel sensor 24 may be configured to estimate the remaining amount of fuel based on the flow rate of fuel supplied through fuel inlet 102 or that of fuel supplied to engine 2, without directly detecting the condition in fuel tank 22.

Based on a signal PWM3 from control unit 34, charger 26 converts electric power received through charging inlet 104 from an external power supply to a voltage level of power storage device 16 for output to power storage device 16.

Control unit 34 generates signals PWM1 and PWM2 for driving power converters 18 and 20, respectively, and outputs generated signals PWM1 and PWM2 to power converters 18 and 20, respectively. During charging of power storage device 16 from an external power supply, control unit 34 generates signal PWM3 for driving charger 26, and outputs generated signal PWM3 to charger 26.

Further, based on signal FL from fuel sensor 24, control unit 34 expresses the remaining amount of fuel as a percentage relative to a filled-up state of fuel tank 22.

Furthermore, based on the respective detected values of voltage VB from voltage sensor 28, current IB from current sensor 30 and temperature TB from temperature sensor 32, control unit 34 calculates a state of charge (hereinafter also referred to as "SOC") of power storage device 16. The SOC represents the amount of stored electric power by a percentage relative to the amount in the fully-charged state of power storage device 16, and indicates the remaining amount of stored electric power in power storage device 16.

For calculating the SOC, various publicly-known techniques can be applied, such as estimating the SOC by employing a map showing the relation between an open circuit voltage (hereinafter also referred to as "OCV") and the SOC of power storage device 16 and measuring the OCV based on a detected value of voltage VB, or estimating the SOC by integrating detected values of current IB.

Control unit 34 then outputs the calculated values of the remaining amount of fuel and the remaining amount of stored electric power in power storage device 16, to energy gauge 36.

Energy gauge 36 is disposed in a display panel such as an instrument panel or a car navigation system. Energy gauge 36 receives the values of the remaining amount of fuel and the remaining amount of stored electric power from control unit 34 to display the received values of the remaining amount of fuel and the remaining amount of stored electric power in a mode of display which will be described below.

Figure 3:
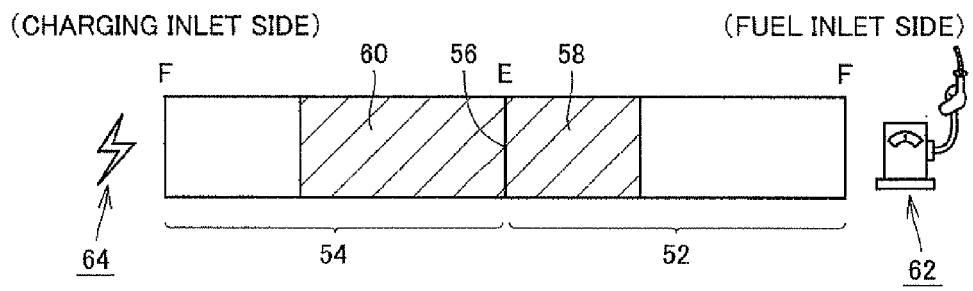
FIG. 3 illustrates an example of a mode of display of an energy gauge shown in FIG. 2.

FIG. 3 illustrates an example of a mode of display of energy gauge 36 shown in FIG. 2. With reference to FIG. 3, energy gauge 36 includes a first section 52, a second section 54, a baseline 56, a first indicator 62 and a second indicator 64.

First section 52 displays the remaining amount of fuel. More specifically, first section 52 extends in the horizontal direction to the right side of baseline 56, and indicates the remaining amount of fuel by a display length or an area of a sub-section 58 starting from baseline 56. The letter "E" shown in proximity to baseline 56 indicates that the remaining amount of fuel is zero or at the minimum. The letter "F" shown in proximity to the right edge of first section 52 indicates the fuel filled-up state.

Second section 54 indicates the remaining amount of stored electric power in power storage device 16. More specifically, second section 54 extends in the horizontal direction to the left side of baseline 56, and indicates the remaining amount of fuel by a display length or an area of a sub-section 60 starting from baseline 56. The letter "E" is shared with first section 52, and indicates that the remaining amount of stored electric power is zero or at the minimum. The letter "F" shown in proximity to the left edge of second section 54 indicates that power storage device 16 is in the fully-charged state.

Baseline 56 is shared between first section 52 and second section 54, serving, in first section 52, as a base indicating that the remaining amount of fuel is zero or at the minimum, and serving, in second section 54, as a base indicating that the remaining amount of stored electric power is zero or at the minimum. That is, in first section 52, sub-section 58 enlarges from baseline 56 with a greater remaining amount of fuel, and the right edge of sub-section 58 moves closer to baseline 56 as the remaining amount of fuel decreases. In second section 54, sub-section 60 enlarges from baseline 56 with a greater remaining amount of stored electric power, and the left edge of sub-section 60 moves closer to baseline 56 as the remaining amount of stored electric power decreases.

Herein, sub-section 58 indicating the remaining amount of fuel with reference to the filled-up state and sub-section 60 indicating the remaining amount of stored electric power with reference to the fully-charged state are displayed continuously and integrally by the same color. Accordingly, the display length or display area of sub-sections 58 and 60 displayed continuously across baseline 56 indicates the total remaining amount of energy in this vehicle.

First indicator 62 is located at the right edge of first section 52, and indicates that data displayed in first section 52 is the remaining amount of fuel. Second indicator 64 is located at the left edge of second section 54, and indicates that data displayed in second section 54 is the remaining amount of stored electric power. The mode of display of first indicator 62 and second indicator 64 is not limited to the design as illustrated. Any mode of display including textual display may be employed, as long as details of display data are recognizable. In addition, the positions at which first indicator 62 and second indicator 64 are located are not limited to the right edge of first section 52 and the left edge of second section 54, respectively. First indicator 62 only needs to be located at the side where first section 52 is displayed with respect to baseline 56, and second indicator 64 only needs to be located at the side where second section 54 is displayed with respect to baseline 56.

Herein, in energy gauge 36, first section 52 is located at the right side of the baseline 56 in correspondence with that fuel inlet 102 (FIG. 1) is disposed on the right side surface of the vehicle, and second section 54 is located at the left side surface of the baseline 56 in correspondence with that charging inlet 104 (FIG. 1) is disposed on the left side of the vehicle. Accordingly, it is recognizable on which side of the vehicle, right or left, fuel inlet 102 and charging inlet 104 are disposed. This avoids user confusion on which side of the vehicle, right or left, a feeding inlet of energy requiring feeding is disposed.

Figure 4:
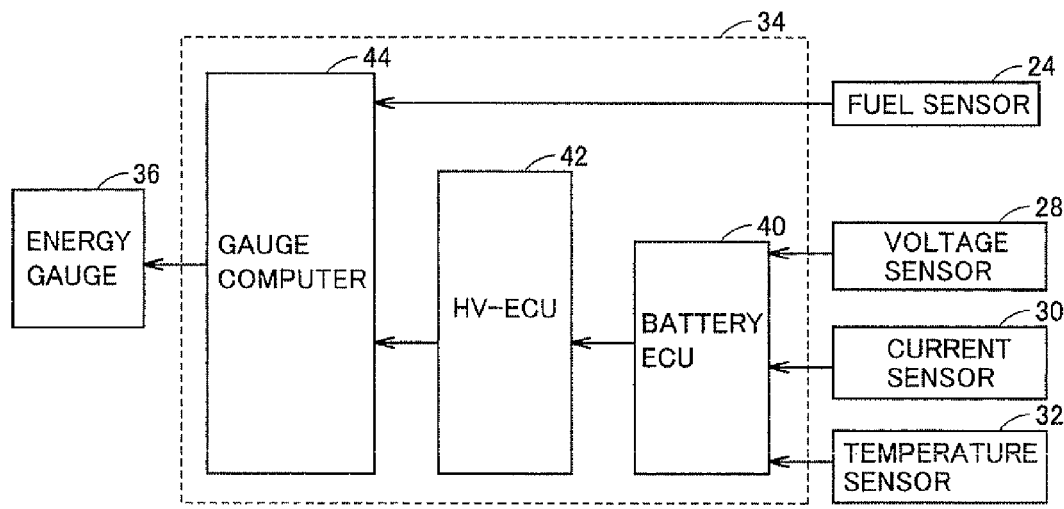
FIG. 4 illustrates a configuration of a control unit shown in FIG. 2.

FIG. 4 illustrates a configuration of control unit 34 shown in FIG. 2. With reference to FIG. 4, control unit 34 includes a battery ECU (Electronic Control Unit) 40, an HV-ECU 42 and a gauge computer 44.

Battery ECU 40 receives a detected value of voltage VB from voltage sensor 28 and a detected value of current IB from current sensor 30. Battery ECU 40 also receives a detected value of temperature TB from temperature sensor 32. Battery ECU 40 then calculates the SOC of power storage device 16 based on the respective detected values of voltage VB, current IB and temperature TB, and outputs the calculated SOC to HV-ECU 42.

HV-ECU 42 executes running control of the vehicle based on the calculated value of the SOC received from battery ECU 40. Specifically, when the SOC is higher than a prescribed threshold value (e.g., 20%), HV-ECU 42 sets the running mode of the vehicle at an EV mode of running without maintaining the SOC. That is, in this EV mode, HV-ECU 42 causes the vehicle to run basically with motor generator 10 consuming electric power stored in power storage device 16 without turning on engine 2 unless the need arises in terms of driving force. The EV mode results in that discharging has a relatively higher ratio than charging, such that the remaining amount of stored electric power in power storage device 16 decreases. When the SOC reaches the threshold value, HV-ECU 42 turns on engine 2 to change the running mode to an HV mode. That is, in this HV mode, HV-ECU 42 turns on engine 2 to cause motor generator 6 to generate power in order to maintain the SOC around the threshold value. Accordingly, in the HV mode, the remaining amount of fuel decreases to a greater degree than in the EV mode. It is to be noted that the HV mode is not limited to running with engine 2 operating continuously.

HV-ECU 42 outputs the calculated value of the SOC received from battery ECU 40, to gauge computer 44.

Gauge computer 44 receives the calculated value of the SOC of power storage device 16 from HV-ECU 42 and the detected value of the remaining amount of fuel from fuel sensor 24. Gauge computer 44 then converts the detected value of the remaining amount of fuel to a percentage relative to the filled-up state, and outputs the converted value of the remaining amount of fuel and the calculated value of the SOC received from HV-ECU 42, to energy gauge 36.

Figure 5:
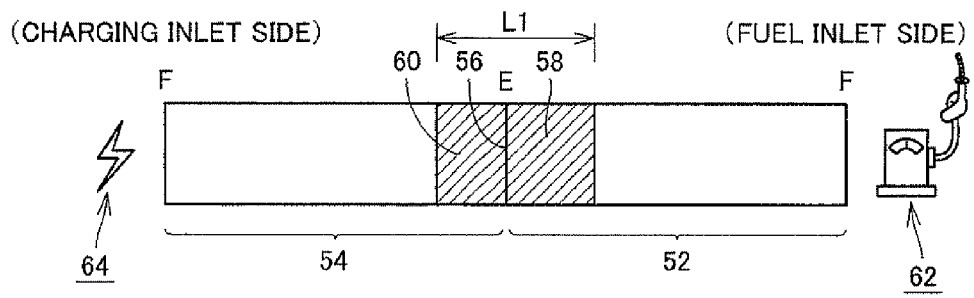
FIG. 5 illustrates another mode of display of the energy gauge shown in FIG. 3.

As described above, sub-section 58 (FIG. 3) indicating the remaining amount of fuel with reference to the filled-up state and sub-section 60 (FIG. 3) indicating the remaining amount of stored electric power with reference to the fully-charged state are displayed continuously and integrally in the same color. However, when, for example, the sum of display lengths of the remaining amount of fuel and the remaining amount of stored electric power falls below a prescribed first threshold value as shown in FIG. 5, the display color of sub-sections 58 and 60 may be changed.

Figure 6:
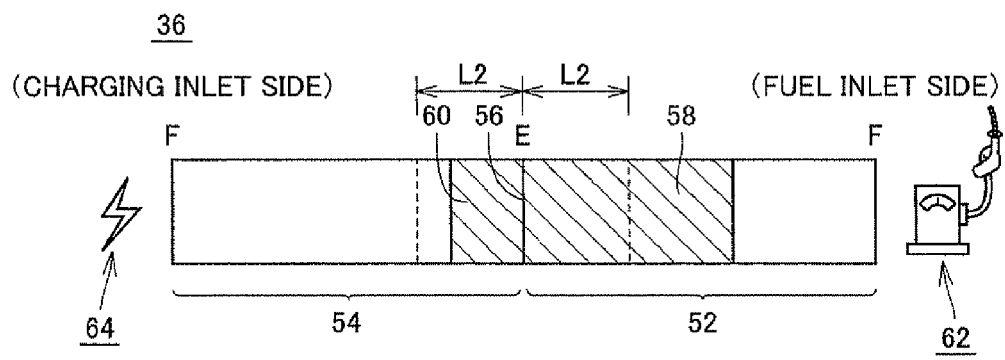
FIG. 6 illustrates still another mode of display of the energy gauge shown in FIG. 3.

Alternatively, as shown in FIG. 6, when at least one of the remaining amount of fuel and the remaining amount of stored electric power falls below a prescribed second threshold value, the display color of sub-sections 58 and 60 may be changed. Priority is preferably given to the display shown in FIG. 5 when the sum of display lengths of the remaining amount of fuel and the remaining amount of stored electric power falls below the prescribed first threshold value, and at least one of the remaining amount of fuel and the remaining amount of stored electric power falls below the prescribed second threshold value.

As described above, in this first embodiment, first section 52 indicating the remaining amount of fuel and second section 54 indicating the remaining amount of stored electric power are displayed continuously across baseline 56, starting from baseline 56. This achieves an integral display of the total remaining amount of the remaining amount of fuel and the remaining amount of stored electric power, while displaying each of the remaining amount of fuel and the remaining amount of stored electric power. Therefore, according to this first embodiment, a user can recognize at a glance each of the remaining amount of fuel and the remaining amount of stored electric power, as well as the total remaining amount thereof.

In this first embodiment, fuel inlet 102 and charging inlet 104 are disposed on the right and left side surfaces of the vehicle, respectively, and first section 52 and second section 54 are located at the right and left sides of baseline 56, respectively, in correspondence with the positions at which fuel inlet 102 and charging inlet 104 are disposed. Accordingly, a user can recognize at a glance the position of a feeding inlet corresponding to energy reduced in the remaining amount (on which side of the vehicle, right or left). Therefore, this first embodiment can avoid user confusion about the positions of the feeding inlets when feeding fuel or electric power from outside the vehicle.

Moreover, according to this first embodiment, first section 52 indicates the remaining amount of fuel while showing a difference from the maximum value of the remaining amount of fuel (in the filled-up state), and second section 54 indicates the remaining amount of stored electric power while showing a difference from the maximum value of the remaining amount of stored electric power (in the fully-charged state). Therefore, a user can recognize at a glance the amount of reduction from the maximum value of each of the remaining amount of fuel and the remaining amount of stored electric power.

Further, according to this first embodiment, the provision of first indicator 62 and second indicator 64 can prevent the user from misidentifying which one of the remaining amount of fuel and the remaining amount of stored electric power first section 52 and second section 54 indicate respectively.

Furthermore, the user can be informed that the total remaining amount of the remaining amount of fuel and the remaining amount of stored electric power decreases by the change in the display color of sub-sections 58 and 60 when the sum of display lengths of the remaining amount of fuel and the remaining amount of stored electric power falls below the first threshold value, as shown in FIG. 5.

Still further, the user can be informed that either the remaining amount of fuel or the remaining amount of stored electric power decreases by the change in the display color of sub-sections 58 and 60 when at least one of the remaining amount of fuel and the remaining amount of stored electric power falls below the second threshold value, as shown in FIG. 6.

First Modification

In the above-described first embodiment, first section 52 and second section 54 of energy gauge 36 extend in the horizontal direction to the right and left sides of baseline 56, respectively, as shown in FIG. 3. However, the mode of display of the energy gauge is not limited to that shown in FIG. 3.

Figure 7:
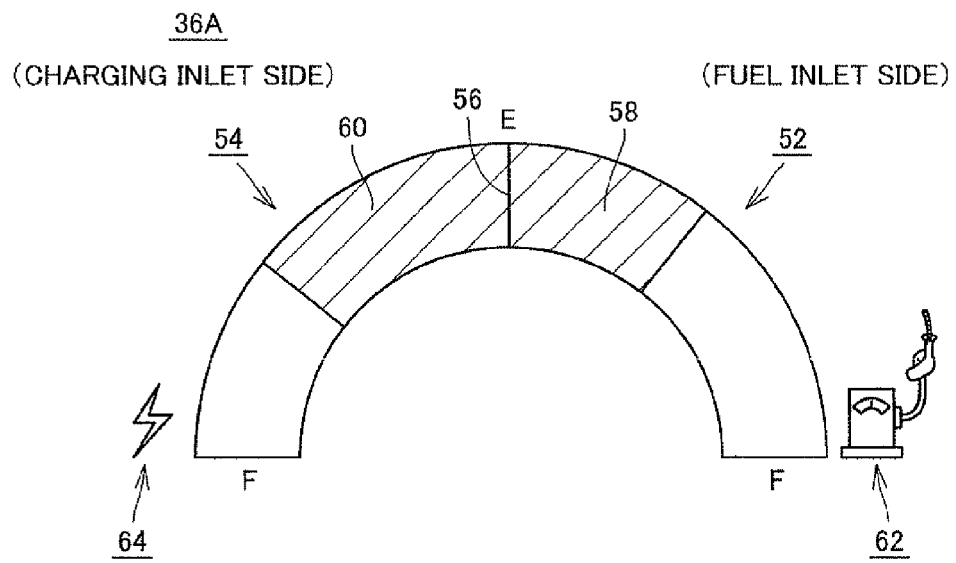
FIG. 7 illustrates an example of a mode of display of an energy gauge according to a first modification.

FIG. 7 illustrates an example of a mode of display of an energy gauge according to this first modification. With reference to FIG. 7, an energy gauge 36A has an arc shape. With respect to baseline 56 located at the middle of the arc, first section 52 indicating the remaining amount of fuel is displayed at the right half of the arc in correspondence with fuel inlet 102 (FIG. 1), while second section 54 indicating the remaining amount of stored electric power in power storage device 16 is displayed at the left half of the arc in correspondence with charging inlet 104 (FIG. 1).

Baseline 56 serving as a base of display is shared between first section 52 and second section 54. In first section 52, sub-section 58 enlarges from baseline 56 with a greater remaining amount of fuel, and sub-section 58 shrinks as the remaining amount of fuel decreases. In second section 54, sub-section 60 enlarges from baseline 56 with a greater remaining amount of stored electric power, and sub-section 60 shrinks as the remaining amount of stored electric power decreases. Sub-sections 58 and 60 are displayed continuously and integrally in the same color.

Second Modification

Figure 8:
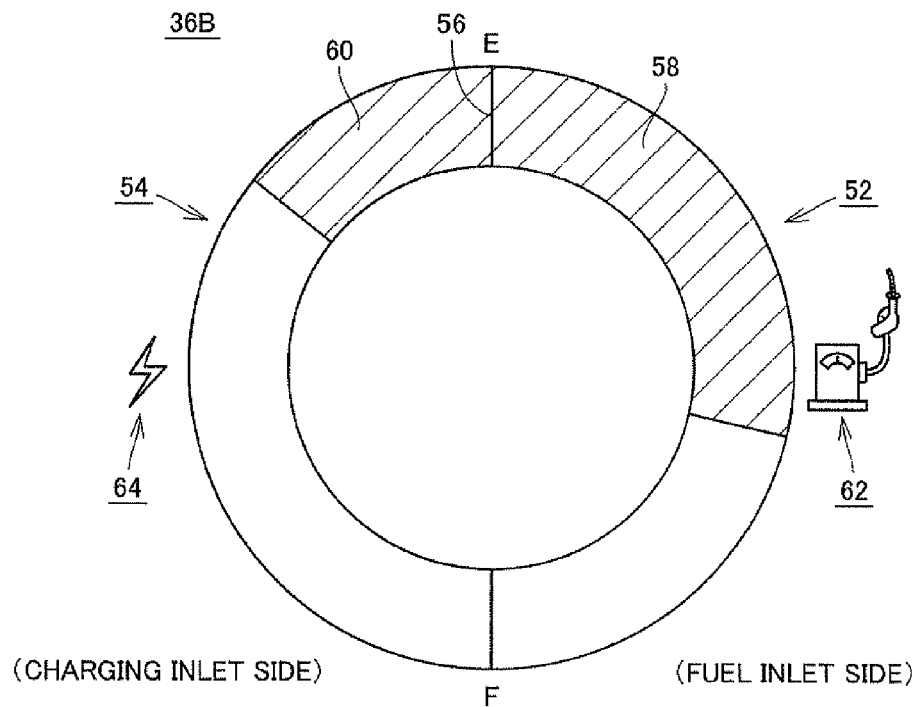
FIG. 8 illustrates an example of a mode of display of an energy gauge according to a second modification.

FIG. 8 illustrates an example of a mode of display of an energy gauge according to a second modification. With reference to FIG. 8, an energy gauge 36B has a circular shape. With respect to baseline 56 located at the upper middle of the circle, first section 52 indicating the remaining amount of fuel is displayed at the right half of the circle in correspondence with fuel inlet 102 (FIG. 1), while second section 54 indicating the remaining amount of stored electric power in power storage device 16 is displayed at the left half of the circle in correspondence with charging inlet 104 (FIG. 1).

Similarly to the first modification, baseline 56 serving as a base of display is shared between first section 52 and second section 54. Sub-sections 58 and 60 enlarge/shrink with respect to baseline 56 in accordance with the remaining amount of fuel and the remaining amount of stored electric power, respectively. Sub-sections 58 and 60 are displayed continuously and integrally in the same color.

Second Embodiment

The first embodiment is directed to hybrid vehicle 100 on which engine 2 and motor generator 10 are mounted as power sources and to which two types of energy, fuel (such as gasoline or light oil) and electric power, can be fed from outside the vehicle. This second embodiment addresses a hybrid vehicle on which a fuel cell and a power storage device are mounted as energy sources and to which two types of energy, fuel for the fuel cell (such as hydrogen) and electric power, can be fed from outside the vehicle.

Figure 9:
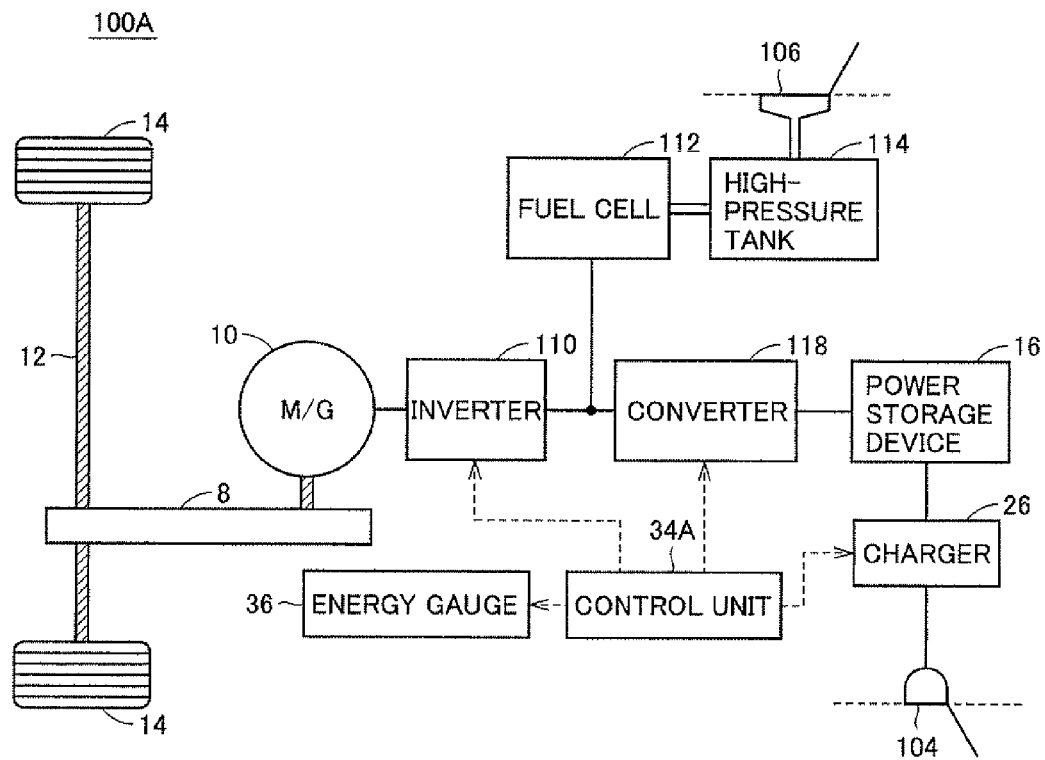
FIG. 9 is a functional block diagram of a hybrid vehicle according to a second embodiment.

FIG. 9 is a functional block diagram of a hybrid vehicle according to the second embodiment. With reference to FIG. 9, a hybrid vehicle 100A includes motor generator 10, reduction gear 8, drive shaft 12 and wheel 14. Hybrid vehicle 100A also includes a fuel cell 112, an inverter 110, a high-pressure tank 114 and a fuel-feeding inlet 106. Hybrid vehicle 100A further includes power storage device 16, a converter 118, charger 26, charging inlet 104, a control unit 34A and energy gauge 36.

Fuel cell 112 is a DC power generation cell acquiring electric energy from chemical reaction energy produced by a chemical reaction between hydrogen received from high-pressure tank 114 and an oxidant. Fuel cell 112 produces DC power for supply to inverter 110. Fuel cell 112 can also supply the produced DC power to converter 118.

High-pressure tank 114 stores the hydrogen fuel received through fuel-feeding inlet 106, and supplies the stored hydrogen fuel to fuel cell 112. The remaining amount of fuel in high-pressure tank 114 is detected by a remaining-fuel-amount sensor not shown (which detects the pressure in high-pressure tank 114, for example, thereby detecting the remaining amount of fuel in the tank) for output to control unit 34A.

Fuel-feeding inlet 106 is a feeding inlet through which a hydrogen fuel is fed to high-pressure tank 114 from outside the vehicle, and is located rearward on the right side surface of the vehicle. It is to be noted that fuel-feeding inlet 106 may be disposed on the left side surface of the vehicle, and charging inlet 104 may be disposed on the right side surface of the vehicle.

Based on a control signal from control unit 34A, converter 118 boosts DC power received from power storage device 16 to a voltage level equivalent to that of an output voltage of fuel cell 112, and outputs the boosted DC power to inverter 110. Converter 118 also down-converts DC power received from inverter 110 and/or fuel cell 112 to the voltage level at power storage device 16 for output to power storage device 16.

Based on a control signal from control unit 34A, inverter 110 converts DC power received from fuel cell 112 and/or converter 118 to AC power for output to motor generator 10. During braking of the vehicle or reduction in the acceleration on a down slope, inverter 110 converts electric power generated by motor generator 10 to DC power for output to converter 118.

Control unit 34A generates control signals for driving inverter 110 and converter 118 for output to inverter 110 and converter 118, respectively. During charging of power storage device 16 from an external power supply, control unit 34A generates a control signal for driving charger 26 for output to charger 26.

Further, control unit 34A receives a detected value of the remaining amount of hydrogen fuel in high-pressure tank 114 by the remaining-fuel-amount sensor not shown, and based on the received detected value, expresses the remaining amount of fuel in high-pressure tank 114 as a percentage relative to the filled-up state. Furthermore, based on the respective detected values of voltage VB from voltage sensor 28, current IB from current sensor 30 and temperature TB from temperature sensor 32 (neither sensor is shown), control unit 34A calculates the SOC of power storage device 16.

Values of the remaining amount of fuel in high-pressure tank 114 and the remaining amount of stored electric power in power storage device 16 are output to energy gauge 36. Energy gauge 36 displays the received values of the remaining amount of fuel and the remaining amount of stored electric power in any of the above-described modes of display.

As described above, the second embodiment can achieve effects similar to those of the first embodiment.

It is to be noted that the second embodiment may be modified similarly to the above-described first and second modifications.

While the above respective embodiments describe that the remaining amount of fuel and the remaining amount of stored electric power are displayed on energy gauge 36 (or 36A, 36B), values of the remaining amount of fuel and the remaining amount of stored electric power may each be expressed as a distance that the vehicle can travel, such that the distance that the vehicle can travel with the remaining amount of fuel and the distance that the vehicle can travel with the remaining amount of stored electric power may be displayed on the gauge, instead of displaying the remaining amount of fuel and the remaining amount of stored electric power as they are.

While the above describes that energy gauge 36 (or 36A, 36B) continuously displays the remaining amount of fuel and the remaining amount of stored electric power (or the distance that the vehicle can travel with the remaining amount of fuel and the distance that the vehicle can travel with the remaining amount of stored electric power), each of the above-described remaining amounts (or each distance that the vehicle can travel) may be displayed as a discrete segment.

While the above describes that first section 52 and second section 54 of energy gauge 36 (or 36A, 36B) are substantially equal in size (length), first section 52 and second section 54 may be changed in size (length) in accordance with the ratio between the energy amount of fuel in the fuel filled-up state and the energy amount of stored electric power in the fully-charged state of power storage device 16, the ratio between the distance that the vehicle can travel with fuel in the filled-up state and the distance that the vehicle can travel with stored electric power in the fully-charged state of power storage device 16, or the like.

While the above describes that power storage device 16 is charged from an external power supply through dedicated charger 26, the method of charging power storage device 16 from an external power supply is not limited to such a method. For example, power storage device 16 may be charged by connecting a pair of electric power lines connected to charging inlet 104, to a neutral point of motor generator 6 and that of motor generator 10, respectively, such that electric power from an external power supply received at the neutral points of motor generators 6 and 10 through charging inlet 104 is converted by power converters 18 and 20, respectively.

While the above-described first embodiment addresses a series/parallel type hybrid vehicle in which the motive power of engine 2 can be split by power split mechanism 4 for transmission to wheel 14 and motor generator 6, the present invention may also be applied to other types of hybrid vehicles. Specifically, the present invention may also be applied to, for example, a so-called series type hybrid vehicle in which engine 2 is used only for driving motor generator 6 and the driving force of the vehicle is produced only by means of motor generator 10, a hybrid vehicle in which only regeneration energy within kinetic energy produced by engine 2 is recovered as electric energy, a motor-assist type hybrid vehicle with the engine mainly providing power and being assisted by a motor according to necessity, and the like. That is, the present invention including the second embodiment is applicable to any vehicle that can be fed with and store a plurality of types of energy from outside the vehicle to run while consuming the stored energy.

Further, the present invention is not limited to a hybrid vehicle fed with fuel and electric power from outside to the vehicle, but may also be applied to a so-called bi-fuel vehicle fed with ethanol (first energy) and gasoline (second energy). That is, the present invention may be embodied by any vehicle that runs with a plurality of types of energy fed from outside the vehicle.

In the above description, each of fuel inlet 102 and fuel-feeding inlet 106 corresponds to an embodiment of "a first feeding inlet" according to the present invention. Charging inlet 104 corresponds to an embodiment of "a second feeding inlet" according to the present invention. Energy gauges 36, 36A and 36B correspond to an embodiment of "a display device" according to the present invention. Charger 26 corresponds to an embodiment of "a charging device" according to the present invention. Motor generator 10 corresponds to an embodiment of "an electric motor" according to the present invention. Engine 2 corresponds to an embodiment of "an internal combustion engine" according to the present invention.

It should be construed that embodiments disclosed herein are by way of illustration in all respects, not by way of limitation. It is intended that the scope of the present inven-

The invention claimed is:

1. A hybrid vehicle capable of running while consuming at least one of first energy and second energy which can be fed from outside the vehicle, comprising:
   first and second feeding inlets through which said first energy and said second energy are fed from outside the vehicle, respectively; and
   a display device for displaying first data on a remaining amount of said first energy and second data on a remaining amount of said second energy by respective magnitudes of a display length or a display area,
   said display device including
   a baseline indicating that values of said first data and said second data are zero or minimum values,
   a first section displaying said first data starting from said baseline, and
   a second section displaying said second data continuously with said first data across said baseline, commonly starting from said baseline,
   said first and second sections being located, with respect to said baseline, at positions corresponding to relative positions in the vehicle at which said first and second feeding inlets are disposed,
   wherein said first and second sections are arranged to be opposite to each other with respect to said baseline.

2. The hybrid vehicle according to claim 1, wherein
   said first feeding inlet is disposed on one of right and left side surfaces of the vehicle,
   said second feeding inlet is disposed on the other one of right and left side surfaces of the vehicle,
   said first section is located at a side corresponding to said one of the side surfaces of the vehicle with respect to said baseline, and
   said second section is located at a side corresponding to the said other one of the side surfaces of the vehicle with respect to said baseline.

3. The hybrid vehicle according to claim 1, wherein
   said first section displays said first data while showing a difference from a maximum value of said first data, and
   said second section displays said second data while showing a difference from a maximum value of said second data.

4. The hybrid vehicle according to claim 1, wherein said display device further includes
   a first indicator provided at the side where said first section is located with respect to said baseline, and indicating that said first data relates to the remaining amount of said first energy, and
   a second indicator provided at the side where said second section is located with respect to said baseline, and indicating that said second data relates to the remaining amount of said second energy.

5. The hybrid vehicle according to claim 1, wherein
   said first data and said second data are displayed integrally across said baseline, and
   when the sum of said first data and said second data falls below a prescribed value, said first and second sections change a mode of display of said first data and said second data with respect to a state in which the sum of said first data and said second data exceeds said prescribed value.

6. The hybrid vehicle according to claim 1, wherein
   said first data and said second data are displayed integrally across said baseline, and
   when one of said first data and said second data falls below a prescribed value, said first and second sections change a mode of display of said first data and said second data with respect to a state in which both of said first data and said second data exceed said prescribed value.

7. The hybrid vehicle according to claim 1, wherein said first and second sections are arranged to extend in a horizontal direction of the vehicle with respect to said baseline.

8. The hybrid vehicle according to claim 1, further comprising:
   a power storage device for storing electric power for the vehicle to run;
   a charging device configured to be capable of charging said power storage device from a power supply outside the vehicle;
   an electric motor for receiving a supply of electric power from said power storage device to generate driving force for running; and
   an internal combustion engine,
   said first energy being fuel consumed by said internal combustion engine, and
   said second energy being the electric power stored in said power storage device.

9. The hybrid vehicle according to claim 1, further comprising:
   a power storage device for storing electric power for the vehicle to run;
   a charging device configured to be capable of charging said power storage device from a power supply outside the vehicle;
   a fuel cell for generating electric power for the vehicle to run; and
   an electric motor for receiving a supply of electric power from at least one of said fuel cell and said power storage device to generate driving force for running,
   said first energy being fuel consumed by said fuel cell, and
   said second energy being the electric power stored in said power storage device.

* * * * *